Jan. 23, 1962   F. C. L. THOMPSON   3,017,774
WEIGHT APPLICATOR FOR USE IN BALANCING VEHICULAR TIRES
Filed Oct. 14, 1959

INVENTOR
FRANCIS C. L. THOMPSON
BY *James M. Drysdale*
ATTORNEY

United States Patent Office 3,017,774
Patented Jan. 23, 1962

3,017,774
WEIGHT APPLICATOR FOR USE IN BALANCING VEHICULAR TIRES
Francis C. L. Thompson, Roseville, Ohio
Filed Oct. 14, 1959, Ser. No. 846,368
2 Claims. (Cl. 73—487)

My invention relates to a device to be used in the balancing of mounted vehicular tires in which the rim of the tire is pivoted in a horizontal plane about its center in such fashion that the several nonuniformities present in the tire cause the tire to tilt about the central pivot, one or more weights then being applied to the peripheral area of said tire such that it then assumes an exactly horizontal attitude: and the object of my invention is to provide a facility whereby the proper magnitude of the weights required for balancing can be determined with speed and accuracy.

The invention will appear more clearly from the following detailed description when taken in connection with the accompanying drawing, showing by way of example a preferred embodiment of the inventive idea.

Figure 1:
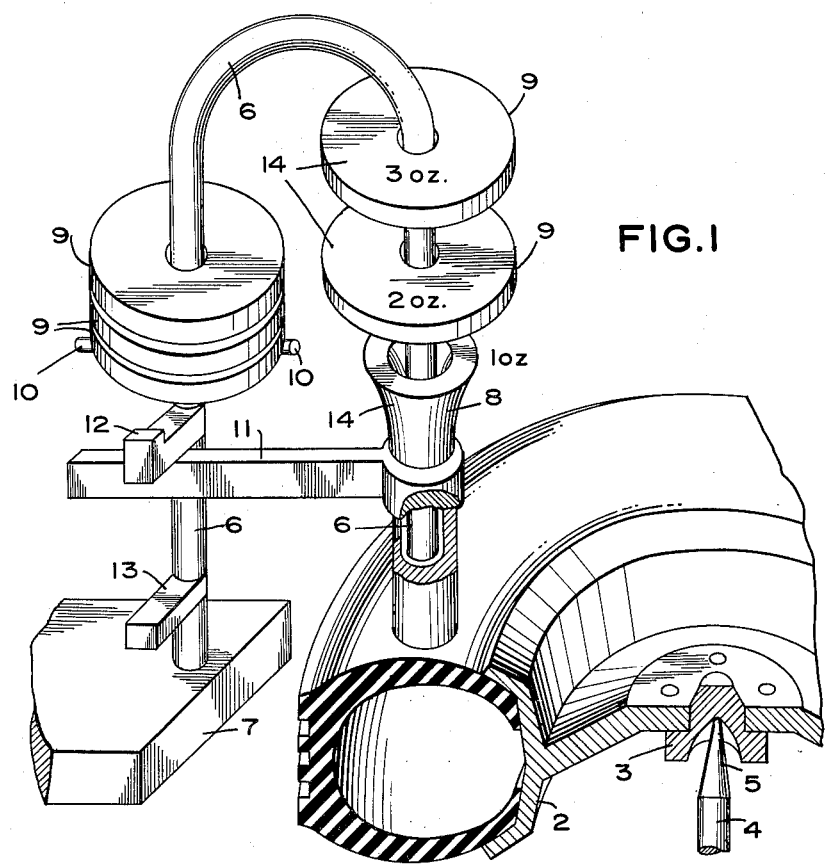
Figure 2:
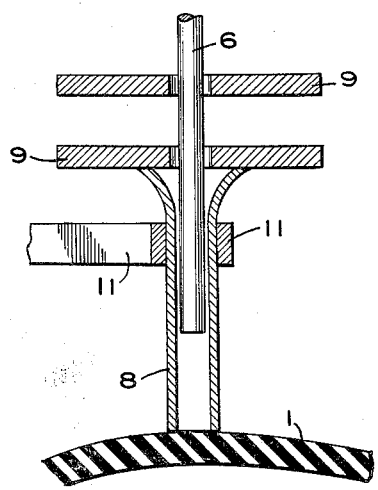

FIGURE 1 is a detailed view in perspective of the invention as it would appear in use during a typical balancing procedure, and FIGURE 2 is a vertical section of the weight applicator portion of the mechanism.

Similar numbers refer to similar parts throughout the two views.

The tire body 1 is mounted on the rim 2. The rim 2 is placed on a center adapter unit 3 which fits into the central hole in the rim 2 provided for the axle bearing of the vehicle on which the tire is to be used. The assembly of tire body 1, rim 2, and the adapter unit 3 is placed in a roughly horizontal position on a pivot cone 5 surmounting a pivot support shaft 4. The pivot support shaft 4 is rigid in a vertical attitude. The pivot cone 5 allows the aforesaid assembly (1,2,3) to tilt off true horizontal position as a result of unequal weight distribution in tire body 1 and/or rim 2.

The guide shaft 6 (free end) is poistioned over the uppermost portion of the curved sidewall of the tire body 1 by movement of the platform 7 to which the fixed end of guide shaft 6 is connected. Platform 7 is then rigidly fixed in a horizontal plane. An axially concentric tube 8 which is free to slide on guide shaft 6 is lowered until its bottom edges contact the uppermost surface of the tire body 1 at the crest of the sidewall curve. Since the guide shaft 6 is fixed at right angles to platform 7 which is now rigid in a horizontal plane, the free end of guide shaft 6 is held rigid in a vertical attitude, and since tube 8 is coaxial with guide shaft 6, tube 8 is constrained to move only in a vertical plane. Weights 9 having a central perforation of a size which allows them to slide freely on guide shaft 6 are placed on the upper end of tube 8 (flared). The combined weight of tube 8 and weights 9 is thereby brought to bear on the tire body 1. Sufficient number of the weights 9 are placed on the upper end of the tube 8 to cause the assembly of tire body 1, rim 2, and center adapter 3 to assume a true horizontal position. When not in use, the central perforations of the weights 9 also allows their storage on the fixed end of guide shaft 6, the weights 9 then resting on a projection 10 connected to the guide shaft 6. An arm 11 is connected to the tube 8 which limits the vertical travel of the tube 8 along the guide shaft 6 by means of an upper stop 12 and a lower stop 13, both connected to guide shaft 6. The upper stop 12 is constructed with a notch on its upper face in which the arm 11 may be placed when it is desired to hold the tube 8 in a raised position, and during placement of the aforesaid assembly (1,2,3) on the pivot cone 5.

When the tire assembly (1,2,3) is found to be in a true horizontal plane as a result of the external weights 9 being applied to the peripheral area of tire body 1 by means of tube 8, the correct physical weight will be permanently connected to the outer edge of rim 2 along a line drawn from the lower end of tube 8 to the pivot cone 5. The correct magnitude of physical weight to fasten to the rim 2 is determined in that each of the weights 9 is graduated and each bears a symbol or character 14 referring to the correct weight to be attached to the rim edge. Since each weight 9 bears a symbol 14 which allows for the difference in distance between the rim edge to the pivot cone 5 and the distance from the lower end of tube 8 to the pivot, reading the symbol 14 printed on the topmost weight which was placed on tube 8 to achieve balance will yield the cumulative total amount required for the rim weight.

Thus it will be observed that the invention contemplates the use of an elongated member and several weights to apply force along a specified line of action to a specified point on a vehicular wheel assembly consisting of drum, rim and tire, or any desired portion thereof. The elongated member is fixed in space so that it serves as a guide for the weights along the desired line of action. The weights are constrained by the guiding member in such manner that they are free to slide along the long axis of that guide member. The particular weight which rests on the body at the point at which force is to be applied is of a shape such that the end of the guiding member does not contact the body to which force is to be applied, and of such shape that this particular weight serves as transmission element between the gravitational force produced by the rest of the weights placed on the guiding member and the body to which the cumulative force is to be applied.

The several weights can be placed individually in any number upon the transmission weight element to achieve a physical balance in the complete or fractional wheel assembly between the cumulative action of all the weights placed thereon and the physical nonuniformities in the aforesaid wheel assembly or portion thereof which cause unbalance about a central pivot point before application of external weights. The several weights as described are to be graduated individually with a reference character or symbol, the last weight placed to achieve balance to bear a character referring to the actual amount of the physical weight to be permanently placed at the intersection of the outer edge of the wheel rim and a line drawn from the point of contact of the transmission weight element and the central pivot point.

Although but a single embodiment of the present invention has been illustrated and described, it will be apparent to those skilled in the art that various changes and modifications may be made therein without departing from the spirit of the invention or from the scope of the appended claims.

As I am aware that the use of rim weights to correct for the physical unbalance of a vehicular tire and that the use of a central pivot to test for this imbalance is not new, I do not claim these ideas as my invention, but I claim:

1. In a weight applicator used in balancing vehicular tires and wheels pivotally mounted in a generally horizontal position for tilting about a vertical axis, the combination of a platform rigidly fixed in a horizontal plane, a U shaped guide shaft mounted on said platform, one arm of said guide shaft fixed at right angles to said platform, the free end of said guide shaft being held rigid in a vertical position, an axially concentric tube free to slide on the free end of said guide shaft, weights having a central perforation adapted to slide freely on the guide shaft placed on the upper end of said tube, the combined weight of tube and weights being sufficient to cause the tire and wheel to assume a true horizontal position.

2. In combination with the apparatus as recited in claim 1 a projection connected to the guide shaft, for supporting the weights when not in use, an arm connected to the tube and an upper stop and a lower stop connected to the guide shaft for limiting the vertical travel of the arm and tube.

References Cited in the file of this patent
UNITED STATES PATENTS

| | | |
|---|---|---|
| 221,149 | Bidwell et al. | Nov. 4, 1879 |
| 531,487 | Vauclain | Dec. 25, 1894 |
| 839,025 | Osgood | Dec. 18, 1906 |
| 1,729,947 | Lannen | Oct. 1, 1929 |